United States Patent Office 3,598,708
Patented Aug. 10, 1971

3,598,708
SURFACE BROMO-CHLORINATED POLYOLEFINS
Winston J. Jackson, Jr., Kingsport, Tenn., assignor to Eastman Kodak Company, Rochester, N.Y.
No Drawing. Filed June 27, 1969, Ser. No. 837,324
Int. Cl. C08f 27/03; C09k 3/28
U.S. Cl. 204—159.18                                15 Claims

ABSTRACT OF THE DISCLOSURE

Bromo-chlorinated shaped polyolefin articles having improved resistance to burning. The bromo-chlorinated shaped polyolefin articles are prepared by immersing the surface(s) of the articles in a brominating agent and then contacting the surface(s) with a chlorinating agent.

---

This invention relates to the bromo-chlorination of solid polyolefins. More particularly, this invention relates to surface bromo-chlorinated shaped polyolefin articles and to the process by which these articles are surface bromo-chlorinated. The term "shaped articles" as used herein includes particles, filaments, staple fibers, yarns, fabrics, carpets, tricots, films, coatings, self-supporting sheets and other extruded, molded, cast or otherwise formed articles. The term "bromo-chlorination" as used herein is intended to denote a polyolefin composition which has, attached to non-aromatic carbon atoms, both bromine and chlorine atoms.

Shaped polyolefin articles which have improved resistance to burning are becoming of increasing importance in numerous applications. The advantages of fire-resistant or self-extinguishing wearing apparel, draperies, floor coverings, coatings and the like made from polyolefins are obvious.

While various methods of producing fire-resistant or self-extinguishing shaped polyolefin articles are known in the prior art, there are some objectionable features in each of the processes heretofore proposed. In general, either the operation of these prior art processes tends to be awkward and inefficient or the polyolefin products obtained tend to be inferior. For example, shaped polyolefin articles can be surface chlorinated through the use of a chlorinating agent in the presence of a chlorination promoter. However, relatively large amounts of chlorine must be incorporated into a polyolefin material before it becomes fire-resistant or self-extinguishing. For this reason, it requires approximately twice as much chlorine to render a polyolefin article self-extinguishing as would be required if bromine were the halogenating agent. Although bromine would initially appear to be the preferred halogenating agent, it has been found that bromine cannot normally be used since extreme reaction conditions are required to produce sufficient bromination of the polyolefin. These extreme reaction conditions, which involve special bromination agents, catalysts, temperature and pressure ranges or the like, usually adversely affect the physical properties of the shaped polyolefin articles being treated.

According to this invention a process has been found whereby polyolefin materials can be made fire-resistant or self-extinguishing without the use of an excessive amount of a halogenating agent. Furthermore, no extreme reaction conditions are involved which might adversely affect the chemical and physical properties of the polyolefin. As a result, the unique polyolefin material produced by the process is useful for numerous purposes.

Therefore, it is an object of this invention to provide bromo-chlorinated shaped polyolefin articles. Another object of this invention is to provide a process whereby the surface of shaped polyolefin articles can be bromo-chlorinated. It is a still further object of this invention to provide shaped polyolefin articles that have improved flame-resistance. Other objects of this invention will be apparent from the description of the invention given hereinafter.

The above objects are accomplished according to the present invention by immersing the surface of a shaped polyolefin article which is to be treated in an excess of a brominating agent and contacting the immersed polyolefin surface with a minor amount of a chlorinating agent at a temperature between about 0° to 150° C. The halogenation mixture may be irradiated with visible or ultraviolet light and the brominating and chlorinating agents agitated in reference to the treated surface to accelerate the bromo-chlorination of the shaped polyolefin article.

The term "polyolefin" as used herein is intended to cover such predominantly crystalline poly-alpha-olefins as high, medium, and low density polyethylene, crystalline polypropylene, polybutene-1, polypentene-1, poly(4-methylpentene-1), ethylene/propylene copolymers, 3-methylbutene-1/4-methylenepentene-1 copolymers and the like as well as other polyolefins containing up to about 30 percent by weight of ethylene. The crystalline propylene or propylene copolymers generally have a density (ASTM D1505) of about .89 to .93, and preferably about .90 to .92, and an inherent viscosity determined in tetralin at 145° C. of about .1 to 3 and preferably .2 to 2, a Vicat softening point (ASTM D1525) greater than 100° C. One process by which such crystalline polyolefins can be prepared is disclosed in U.S. Pat. 3,412,078. Therefore, a description concerning the preparation of the crystalline polyolefins is not thought to be necessary and will not be given. Although the crystalline polyolefins are preferred because of their superior properties, this invention is also applicable to amorphous polyolefins.

Although the precise scientific principles and reactions involved in the process of this invention are not definitely known, they are believed to involve the following: Under identical reaction conditions, the bromination of a polyolefin surface takes place at an appreciably slower rate than chlorination. By carrying out the bromination reaction in the presence of a minor amount of chlorine it has been found that the rate of bromination and the degree of bromination of the polyolefin are greatly increased. The reason for this, presumably, is because chlorine radicals are more energetic than bromine radicals and react more readily with the polyolefin to remove a hydrogen atom in the first step of the halogenation mechanism:

$$R{:}H + X \cdot \rightarrow R \cdot + HX \qquad \text{Equation 1}$$

wherein R is the remainder of the polyolefin chain and X· is a bromine or chlorine free radical. According to T. L. Cottrell, "The Strengths of Chemical Bonds," 2nd edition, Butterworths, London, 1958, the energy required to dissociate a hydrocarbon, R:H, wherein H is a tertiary hydrogen atom, is about 89 kcal./mole (94 kcal./mole for a secondary hydrogen and 100 kcal./mole for a primary hydrogen atom); the energy released when the HBr bond is formed in 87 kcal./mole, and 102 kcal./mole is released when the HCl bond is formed. Consequently, Equation 1 is endothermic when X is bromine and exothermic when X is chlorine. Therefore, it is assumed that this step of the bromo-chlorination takes place considerably more readily when X is chlorine. The second step of the bromo-chlorination is quite exothermic for both chlorine and bromine:

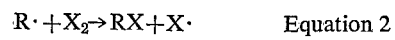

$$R \cdot + X_2 \rightarrow RX + X \cdot \qquad \text{Equation 2}$$

The bond dissociation energy for bromine is 46 kcal./mole, and that for chlorine is 57 kcal./mole; the energy released by formation of RBr is about 65 kcal./mole, and that for RCl is about 81 kcal./mole. Equation 1, therefore, is the rate-determining step.

Since chlorination takes place more readily than bromination, it is necessary to use an excess of bromine, relative to that of chlorine, if bromination is to be the dominant reaction. When a free radical on the polyolefin chain is produced by chlorine (Equation 1), an excess of bromine over chlorine is present for this radical to react with (Equation 2). Of course, some chlorination of the polyolefin will also take place, but the amount of such chlorination can be controlled through regulating the bromide to chlorine ratio. That is, if the bromine to chlorine ratio is high, then the rate of bromination that will occur on the polyolefin chain will be higher than the chlorination that will occur. Thus, the average molar concentration of bromine to chlorine should be greater than 1:1. Normally the average molar concentration of bromine should be at least two times and preferably at least three times that of the chlorine.

The poylolefin shaped articles may be brominated simply by contacting them with gaseous bromine and chlorine in the presence of visible radiation, ultraviolet radiation, and/or heat for a sufficient time for the desired degree of halogenation to be attained. Another process consists of immersing the shaped articles in a brominating agent or solution and passing in a chlorinating agent or solution while the mixture is heated and/or irradiated with visible or ultraviolet radiation. Bromine water is one example of a brominating agent or solution. Instead of water, an organic solvent may be used which will not substantially affect the physical properties of the shaped article other than to cause slight swelling. The type of solvent which may be used depends upon the polymer structure. In general, suitable organic solvents include carbon tetrachloride, acetic acid, or chlorobenzene.

The bromination reactions may be carried out at or below room temperature, preferably with the reaction mixtures being irradiated with visible or ultraviolet radiation. A more rapid reaction occurs if the mixture is also heated. Temperatures of 0° to 150° C. may be used, depending upon the stability of the polymer, but temperature of 70° to 100° C. are preferred in an aqueous or gaseous system. The reaction mixture may be heated without illumination with visible or ultraviolet radiation, but a longer reaction time is required.

When the bromination is carried out in a liquid medium the reaction may be enhanced by use of a free radical catalyst or halogenation promoter instead of, or in addition to, heat or illumination. Since the catalyst initiates the free radical reaction by first dissociating into free radicals itself, the catalyst that can be used depends upon the reaction temperature, which must be sufficiently high to cause dissociation at a reasonable rate. Examples of suitable free radical catalysts include acetyl peroxide, benzoyl peroxide, lauroyl peroxides, azobisisobutyronitrile, t-butylperoxypivalate, diisopropylperoxydicarbonate, hydrogen peroxide, the alkali metal persulfates, and t-butylperoxide.

At the conclusion of the bromination the polyolefin shaped articles may be rinsed with water or an organic solvent and dried, or they may be only heated in order to remove liquid and gaseous components from the chlorination reaction. Acetone is a preferred solvent for use in rinsing the polyolefin shaped articles.

Bromine is the preferred brominating agent, but others may be used under the above reaction conditions in either an aqueous medium or in organic solvents. Examples of other effective brominating agents include sulfuryl bromide, phosphorus pentabromide, t-butyl hypobromite, sodium hypobromite, potassium hypobromite, and hypobromous acid. Preferably, chlorine gas is used in the process. However, examples of other effective chlorinating agents include sulfuryl chloride, phosphorus pentachloride, t-butyl hypochlorite, sodium hypochlorite, potassium hypochlorite, and hypochlorous acid.

The amount of bromine which must be substituted on the surface of a shaped article in order to make it self-extinguishing depends upon the structure of the polyolefin. If 0.5 to 10 weight percent and preferably about 3 weight percent of an antimony compound (e.g., antimony trioxide, antimony chloride, and antimony oxychloride) is incorporated in the shaped polyolefin article, less bromine is required due to the synergistic action of the materials in order for the article to have improved resistance to burning or to the self-extinguishing. For example, only one to two percent bromine is required to make polypropylene fibers self-extinguishing when they contain three percent of antimony trioxide.

It is very surprising that the bromination reaction itself ever takes place to any appreciable degree between a solid polyolefin surface and bromine in a gaseous or liquid medium. Normally bromine will not react with a solid polyolefin under these conditions to give a halogenated product. It is equally surprising that improved resistance to burning results when the polyolefin shaped article contains only a relatively small amount of bromine attached to surface carbon atoms. If the polyolefin is a fiber of polypropylene, for instance, only about 3 to 4 percent bromine is required to make the fibers self-extinguishing, and 1 to 2 percent bromine imparts improved resistance to burning. In contrast, when the polypropylene is brominated throughout and not just substantially on the surface, then over ten percent bromine is required to make the fiber self-extinguishing.

Since the bromine is attached substantially to the surface, there is only a relatively small effect on the tensile properties. When crystallinity is present, the interior of the films and fibers remains crystalline, and the tensile and textile properties, therefore, are maintained. In contrast, when a crystallizable polyolefin is brominated throughout, it may lose its ability to be crystallized. Consequently, it will have lower tensile properties and melting point. Also, the polyolefin tends to become susceptible to solvents.

The polyolefin shaped articles which are brominated according to this invention may contain various additives, such as pigments, antioxidants, and stabilizers. Examples of stabilizers which may be used include organo-tin sulfur, organo-tin, epoxy, aziridinyl, urea phosphite, and unsaturated aliphatic compounds, powdered calcium carbonate, and fatty acid salts of metals, such as cadmium, zinc, and tin.

This invention will be further illustrated by the following examples of preferred embodiments. In these examples, all fibers and films are first washed with an aqueous detergent solution to remove any lubricants which may be present. The term "self-extinguishing" indicates that the shaped polyolefin article stops burning within a few seconds after removal of a bunsen burner flame. in most examples, this occurs immediately upon removal of the flame. All unbrominated shaped polyolefin articles burn readily. All ratios given in the following examples are molar and all percentages are given in weights based on the weight of the shaped polyolefin article.

EXAMPLE 1

Six three-inch squares of fabric samples made from drafted, heat-set, melt spun 2.5 denier/filament yarn of crystalline polypropylene (density of 0.92) are immersed together in 400 grams of a 10 percent solution of bromine (0.25 mole) in chlorobenzene and slowly stirred while chlorine gas is bubbled through the solution at a rate of 6 grams (0.085 mole)/hour (g./hr.). The solution is held at a temperature of 70° C. under 1 atmosphere of pressure. No irradiation of any type is passed into the solution. After 2 hours 12 g. (0.17 mole) of chlorine has been added. The samples are then removed, washed in chlorobenzene, and dried. The samples contain 6.5 percent bromine, 3.2 percent chlorine, and are self-extinguishing.

EXAMPLE 2

The presence of a chlorinating agent is essential to the chloro-bromination of the polyolefin. To illustrate this fact, the procedure of Example 1 is repeated with the exception that no chlorine is bubbled through the solution. After 2 hours the sample is removed from the solution and analyzed. The sample contains only 0.41 percent bromine and burns readily when exposed to an open flame.

EXAMPLE 3

The procedure of Example 1 is repeated with the exception that 2 grams of benzoyl peroxide is added to the 10 percent solution of bromine. After the 2-hour reaction period the fabric contains 7.4 percent bromine, 3.6 percent chlorine, and is self-extinguishing.

EXAMPLE 4

Again, to illustrate the necessity of a chlorinating agent in the chloro-bromination of polyolefins, the procedure of Example 3 is repeated with the exception that no chlorine is bubbled through the solution. After the 2-hour reaction period the fabric contains only 0.50 percent bromine and burns readily when exposed to an open flame.

EXAMPLE 5

Three samples knit from a drafted, heat-set, continuous melt-spun crystalline polypropylene (density 0.92) yarn of 9.8 denier/filament containing 3 percent by weight of antimony trioxide, which was incorporated in the polymer with a Banbury mixer before melt spinning, are immersed together in 350 grams of an aqueous mixture containing 5 percent bromine. The solution is held at a temperature of 60° C. under 1 atmosphere of pressure and is irridiated with a 300-watt visible floodlamp. Chlorine is bubbled into the solution at a rate of 2 g./hr. as the samples are slowly stirred.

After a reaction period of 5 minutes the first sample is removed from the aqueous mixture. The second and third samples are removed after reaction periods of 30 minutes and 1 hour, respectively. Each sample is washed with water and acetone, dried, and analyzed. The first sample contains 1.6 percent bromine and 0.4 percent chlorine. The second sample contains 12.7 percent bromine and 3.1 percent chlorine. The third sample contains 18.3 percent bromine and 4.7 percent chlorine. All three samples are self-extinguishing.

EXAMPLE 6

A three-inch square fabric sample made of drafted, heat-set, continuous melt spun crystalline polyethylene fiber (density 0.97) of 8 denier/filament is attached to a glass stirrer and placed in the center of a 3-liter flask which contains 30 grams of liquid bromine. The flask is fitted with a water-cooled condenser and thermometer. A 275-watt ultraviolet lamp, placed about 1 inch from the flask, is used to heat the contents of the flask (predominantly bromine, B.P. 58° C.) to 70° C. While chlorine gas is passed into the flask at a rate of about 2 g./hr., the stirrer is slowly turned and halogenation is allowed to proceed for 20 minutes. The fabric sample is then removed, washed with acetone, dried, and analyzed. The sample contains 16.7 percent bromine, 7.1 percent chlorine, and is self-extinguishing.

When the halogenation proceeds for 10 minutes instead of 20 minutes, the sample contains 9.1 percent bromine and 3.2 percent chlorine and is not self-extinguishing.

EXAMPLE 7

The procedure of Example 6 is repeated except that the fabric sample is made of 6-denier crystalline poly(4-methylpentene-1) yarn. The fabric sample contains 13.5 percent bromine, 6.0 percent chlorine and is self-extinguishing.

EXAMPLE 8

The procedure of Example 6 is repeated except that a four-foot length of drafted, heat-set, continuous melt-spun high density crystalline polyethylene (density 0.97) monofilament 6 denier/filament fiber is coiled upon itself and attached to the tip of a glass stirrer. The effect of the surface halogenation on the fiber properties is as follows:

| | Halogen content, percent | | Tenacity, grams/ denier | Elongation, percent | Elastic modulus, grams/ denier |
| --- | --- | --- | --- | --- | --- |
| | Br | Cl | | | |
| Control polyethylene sample (no bromo-chlorination) | 0 | 0 | 5.1 | 14.0 | 59.6 |
| Bromo-chlorinated polyethylene sample | 15.6 | 6.8 | 4.0 | 9.8 | 76.4 |

The control sample is not self-extinguishing while the bromochlorinated sample is self-extinguishing.

EXAMPLE 9

The procedure of Example 8 is repeated except that a fiber of 6 denier/filament crystalline polypropylene (density 0.92) is used. The effect of the surface halogenation on the polypropylene fiber properties is as follows:

| | Halogen content, percent | | Tenacity, grams/ denier | Elongation, percent | Elastic modulus, grams/ denier |
| --- | --- | --- | --- | --- | --- |
| | Br | Cl | | | |
| Control polypropylene sample (no bromo-chlorination) | 0 | 0 | 7.0 | 17.8 | 77.7 |
| Bromo-chlorinated polypropylene sample | 6.2 | 3.8 | 6.3 | 15.1 | 82.6 |

The control sample is not self-extinguishing while the bromochlorinated sample is self-extinguishing.

EXAMPLE 10

The procedure of Example 8 is repeated except that a fiber of crystalline copolymer (80 mole percent 3-methylbutene-1 and 20 mole percent 4-methylpentene-1) is used. The fiber contains 14.9 percent bromine and 5.8 percent chlorine and is self-extinguishing.

EXAMPLE 11

The procedure of Example 6 is repeated except that a three-inch square sample of film made of crystalline polyethylene (density 0.95) is used. The film contains 19.6 percent bromine and 5.4 percent chlorine and is self-extinguishing.

EXAMPLE 12

The procedure of Example 11 is repeated except that a reaction time of 2 hours is used. The film contains 70.1 percent bromine and 16.2 percent chlorine.

EXAMPLE 13

In order to obtain an excess of bromine over chlorine on the polyolefin, it is necessary for the amount of bromine in the reaction mixture to be appreciably greater than that of chlorine. To illustrate this fact, the procedure of Example 1 is repeated with the exception that the bromine is added simultaneously with the chlorine at the same molar rate (0.085 m./hr.). After the 2-hour reaction time a fabric sample contains 2.1 percent bromine and 5.4 percent chlorine and is self-extinguishing.

EXAMPLE 14

A solution containing 20 g. of crystalline polypropylene (density 0.92), 20 g. of bromine, and 250 g. of tetrachloroethane is stirred at 70° C. while chlorine gas is slowly passed in at a rate of approximately 6 g. (0.085 mole)/hr. for 30 minutes. The solution is then cooled and the polymer is precipitated by the addition of methanol, collected, and washed with acetone. The polymer, which contains 8.7 percent bromine and 4.8 percent chlorine, is dry spun into fibers from a trichloroethylene solution. The fibers are not self-extinguishing although they contain 8.7 percent bromine and 4.8 percent chlorine dispersed therein. Thus, this illustrates that substantially more bromine and chlorine must be dispersed throughout the polymer in order for it to be self-extinguishing than would be required if surface bromo-chlorination is employed.

The invention has been described in detail with particular reference to preferred embodiments thereof, but it will be understood that variations and modifications can be effected within the spirit and scope of the invention.

I claim:

1. A process for bromo-chlorinating a shaped aliphatic polyolefin article which comprises contacting said shaped aliphatic polyolefin article with a brominating agent in the presence of a chlorinating agent, said article and said agents being maintained at a temperature between about 0° C. and 150° C., the ratio of bromine atoms to chlorine atoms being greater than 1:1, whereby the surface of said shaped polyolefin article is bromo-chlorinated, the amount of bromine on the surface being at least about one percent of the weight of said shaped polyolefin article.

2. A process as defined in claim 1 wherein said polyolefin is polypropylene.

3. A process as defined in claim 1 wherein said polyolefin is polyethylene.

4. A process as defined in claim 1 wherein said polyolefin is a copolymer of 3-methylbutene.

5. A process as defined in claim 1 wherein said polyolefin is a coplymer of 3-methylbutene-1 and 4-methylpentene-1.

6. A process as defined in claim 1 wherein said article and said agents are maintained at a temperature between about 70° and about 100° C.

7. A process as defined in claim 1 wherein said brominating agent is selected from the group consisting of bromine, sulfuryl bromide, phosphorous, pentabromide, t-butyl hypobromate, sodium hypobromite, potassium hypobromite, and hypobromous acid.

8. A process as defined in claim 1 wherein said chlorinating agent is selected from the group consisting of chlorine, sulfuryl chloride, phosphorous pentachloride, t-butyl hypochlorite, sodium hypochlorite, potassium hypochlorite, and hypochlorous acid.

9. A process as defined in claim 1 wherein a halogenation promoter is added to said process, said halogenation promoter being selected from the group consisting of acetyl peroxide, benzoyl peroxide, lauroyl peroxide, azobisisobutyronitrile, t-butylperoxypivalate, diisopropylperoxydicarbonate, hydrogen peroxide, the alkali metal persulfates, and t-butyl peroxide.

10. A process as defined in claim 1 wherein said process is irradiated with visible or ultraviolet radiation.

11. A shaped article consisting essentially of an aliphatic polyolefin wherein the surface of said shaped article contains both bromine and chlorine, the ratio of bromine atoms to chlorine atoms being greater than 1:1, the amount of bromine being at least about one percent of the weight of said shaped article.

12. A shaped article as defined in claim 11 wherein sail aliphatic polyolefin is polypropylene.

13. A shaped article as defined in claim 11 wherein said aliphatic polyolefin is polyethylene.

14. A shaped article as defined in claim 11 wherein said aliphatic polyolefin is a copolymer of ethylene and propylene.

15. A shaped article as defined in claim 11 wherein said aliphatic polyolefin is a copolymer of 3-methylbutene-1 and 4-methylpentene-1.

References Cited

UNITED STATES PATENTS

| 2,276,951 | 3/1942 | Fisher | 260—94.9 |
|---|---|---|---|
| 2,403,200 | 7/1946 | Weiss et al. | 161—253 |
| 2,962,482 | 11/1960 | Cottle et al. | 260—85.3 |
| 3,009,904 | 11/1961 | Serniuk et al. | 260—85.3 |
| 3,009,906 | 11/1961 | Eichhorn et al. | 260—93.5 |
| 3,297,675 | 1/1967 | Fuhrmann et al. | 260—94.9 |
| 3,454,672 | 7/1969 | Jackson, Jr., et al. | 260—860 |
| 3,482,926 | 12/1969 | Cappuccio | 8—115.5 |

DONALD E. CZAJA, Primary Examiner

R. A. WHITE, Assistant Examiner

U.S. Cl. X.R.

8—115.5; 260—45.7R, 88.2S, 94.9H

UNITED STATES PATENT OFFICE
CERTIFICATE OF CORRECTION

Patent No. 3,598,708　　　　　　　　　Dated August 10, 1971

Inventor(s) Winston J. Jackson, Jr.

It is certified that error appears in the above-identified patent and that said Letters Patent are hereby corrected as shown below:

Column 2, line 21, delete "4-methylenepentene-1" and
　　　insert ---4-methylpentene-1---.
Column 2, line 59, delete "in" and insert ---is---.
Column 5, line 36, delete "irridiated" and insert
　　　---irradiated---.
Column 7, line 41, Claim 7, delete "hypobromate" and
　　　insert ---hypobromite---.

Signed and sealed this 25th day of January 1972.

(SEAL)
Attest:

EDWARD M. FLETCHER, JR.　　　　　　ROBERT GOTTSCHALK
Attesting Officer　　　　　　　　　Commissioner of Patents